UNITED STATES PATENT OFFICE.

D. WILLARD DUDLEY, OF MONTPELIER, ASSIGNOR OF ONE HALF TO WILLIAM V. PECK, OF CALAIS, VERMONT.

FERTILIZER.

SPECIFICATION forming part of Letters Patent No. 353,210, dated November 23, 1886.

Application filed December 3, 1885. Serial No. 184,605. (No specimens.)

*To all whom it may concern:*

Be it known that I, D. WILLARD DUDLEY, a citizen of the United States, residing at Montpelier, in the county of Washington and State of Vermont, have invented a certain new and useful Improvement in Fertilizers and the Process of Preparing the same, of which the following is a description of the invention, which will enable others skilled in the art to which it appertains to make and use the same.

My invention relates to that class of fertilizers which are used both for top dressing and mixing with the soil. It also destroys potato-bugs when applied to the growing crop.

It consists of a composition formed, as hereinafter stated, of wood-ashes, plaster, lime, salt, and bone-meal.

The bone-meal is first mixed with an equal amount of wood-ashes, (by measure.) The mixture is saturated with water and remains in that condition for three weeks, when it is ready to mix with the other ingredients. The lime used in my fertilizer is first slaked with brine, using only a small quantity of brine, leaving the lime when slaked dry like flour. I claim that by slaking the lime with brine it (the lime) retains more of its fertilizing properties. After the bone-meal has been prepared as above described and the lime slaked as above stated, mix the two together, adding gypsum or ground plaster and salt in equal quantities, these ingredients to be thoroughly mixed and mingled, which constitute my improved fertilizer, which consists, when completed, of equal parts of wood-ashes, plaster or gypsum, lime, salt, and bone-meal.

I am aware of several patents for fertilizing compositions out of which a fertilizing composition similar to mine might be made; but not one of said patents describes my composition in its entirety; and, furthermore, in all said patents ingredients are described and claimed which I omit from my composition without affecting its efficiency.

My improved fertilizer is also free from unwholesome and disagreeable odors.

What I claim, and desire to secure by Letters Patent, is—

The process of preparing fertilizers, which consists, first, in mixing and saturating equal quantities of bone-meal and wood-ashes with water, and allowing them to remain in such condition for about three weeks; second, slaking lime in brine and adding it to the mixture of bone meal and ashes, and, third, in adding gypsum and salt in equal quantities to the mass, as set forth.

D. WILLARD DUDLEY.

Witnesses:
R. R. RIKE,
T. J. DEAVITT.